(12) United States Patent
Vangala et al.

(10) Patent No.: US 10,972,893 B1
(45) Date of Patent: Apr. 6, 2021

(54) CELLULAR VEHICLE TO EVERYTHING ASSISTED NEXT GENERATION EMERGENCY CALL

(71) Applicant: QUALCOMM Incorporated, San Diego, CA (US)

(72) Inventors: Sudheer Kumar Reddy Vangala, San Diego, CA (US); Stephen William Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/784,083

(22) Filed: Feb. 6, 2020

(51) Int. Cl.
*H04M 9/00* (2006.01)
*H04W 4/90* (2018.01)
*H04W 4/029* (2018.01)
*H04W 4/48* (2018.01)
*H04W 76/10* (2018.01)

(52) U.S. Cl.
CPC ............. *H04W 4/90* (2018.02); *H04W 4/029* (2018.02); *H04W 4/48* (2018.02); *H04W 76/10* (2018.02)

(58) Field of Classification Search
CPC ..... H04W 4/029; H04W 48/04; H04W 4/027; H04W 4/30; H04W 4/44; H04W 12/04; H04W 12/08; H04W 12/0802; H04W 12/0804; H04W 12/0808; H04W 24/08; H04W 28/0268; H04W 36/0027; H04W 36/0033; H04W 48/10; H04W 48/16; H04W 68/005; H04W 76/11; H04W 76/12; H04W 76/15; H04W 76/27; H04W 8/183; H04W 92/045

USPC ... 455/456.3, 575.8, 414.1, 404.1, 450, 417, 455/452.1, 566, 552.1
See application file for complete search history.

(56) References Cited

U.S. PATENT DOCUMENTS

| | | | | |
|---|---|---|---|---|
| 9,288,652 | B2* | 3/2016 | Yuasa | H04W 4/90 |
| 9,360,854 | B2* | 6/2016 | Kotecha | B60K 37/06 |
| 9,805,601 | B1* | 10/2017 | Fields | G06Q 40/08 |
| 9,918,220 | B1* | 3/2018 | Chastain | H04W 8/04 |
| 10,032,226 | B1* | 7/2018 | Suizzo | G06Q 10/10 |
| 2007/0123208 | A1* | 5/2007 | Batta | H04W 72/10 |
| | | | | 455/404.1 |
| 2010/0279647 | A1* | 11/2010 | Jacobs | H04W 4/90 |
| | | | | 455/404.1 |
| 2012/0230244 | A1* | 9/2012 | Bienas | H04W 40/22 |
| | | | | 370/315 |
| 2016/0100303 | A1* | 4/2016 | Kim | H04W 4/023 |
| | | | | 455/426.1 |

(Continued)

*Primary Examiner* — Joseph Arevalo
(74) *Attorney, Agent, or Firm* — Seyfarth Shaw LLP

(57) ABSTRACT

A method is presented. The method includes receiving a trigger for establishing an emergency call at a first vehicle and determining, in response to the trigger, whether a communication system associated with the first vehicle currently has access to a first wireless communications network. The method also includes searching for a second wireless communications network when the communication system currently does not have access. The method further includes searching for a second vehicle with peer-to-peer wireless access capability when the second wireless communications network is not found. The method still further includes transmitting vehicle related data to the second vehicle via the peer-to-peer wireless access capability when the second vehicle is found.

24 Claims, 7 Drawing Sheets

(56) References Cited

U.S. PATENT DOCUMENTS

| | | | |
|---|---|---|---|
| 2016/0127534 A1* | 5/2016 | Celik | H04M 1/72436 |
| | | | 455/566 |
| 2016/0285800 A1* | 9/2016 | Qian | H04L 67/10 |
| 2017/0201850 A1* | 7/2017 | Raleigh | G06F 3/0482 |
| 2017/0244840 A1* | 8/2017 | Kamat | H04M 7/0006 |
| 2017/0248949 A1* | 8/2017 | Moran | G08G 1/165 |
| 2017/0311228 A1* | 10/2017 | Zavesky | H04W 48/04 |
| 2018/0024549 A1* | 1/2018 | Hurd | G05D 1/0016 |
| | | | 701/2 |
| 2018/0176757 A1* | 6/2018 | Kaindl | G08B 25/016 |
| 2018/0219885 A1* | 8/2018 | Ahmadzadeh | H04L 63/1408 |
| 2018/0234817 A1* | 8/2018 | Hunt | H04W 76/10 |
| 2018/0301034 A1* | 10/2018 | Morita | G01C 21/3602 |
| 2019/0141603 A1* | 5/2019 | Vulgarakis Feljan | |
| | | | H04W 40/20 |
| 2019/0174429 A1* | 6/2019 | Wang | H04W 52/54 |
| 2019/0200170 A1* | 6/2019 | Li | H04W 8/265 |
| 2019/0220035 A1* | 7/2019 | Wengreen | G08G 1/202 |
| 2019/0239276 A1* | 8/2019 | Virtanen | H04W 76/18 |
| 2019/0245576 A1* | 8/2019 | Ehrentraut | H04W 4/90 |
| 2019/0295398 A1* | 9/2019 | Khac | G16H 80/00 |
| 2020/0015063 A1* | 1/2020 | Lee | H04W 88/18 |
| 2020/0015134 A1* | 1/2020 | Yang | H04W 36/08 |
| 2020/0053195 A1* | 2/2020 | Park | H04W 4/023 |
| 2020/0092928 A1* | 3/2020 | Shi | H04W 76/15 |

\* cited by examiner

CELLULAR VEHICLE TO EVERYTHING ASSISTED NEXT GENERATION EMERGENCY CALL

BACKGROUND

Field

Aspects of the present disclosure generally relate to emergency calls, and more specifically, to forwarding vehicle related data via a peer-to-peer network.

Background

In-vehicle emergency systems improve emergency assistance to vehicles. In some cases, an emergency system installed in a vehicle dials an emergency number in the event of an accident. The emergency system may also transmit the vehicle's coordinates to local emergency agencies. Transmission of the emergency call and the corresponding information may be dependent on access to a cellular network, such as a public safety network. It is desirable to improve emergency call systems to mitigate an inability to transmit emergency information when a vehicle cannot access a cellular network.

SUMMARY

In one aspect of the present disclosure, a method is disclosed. The method includes receiving a trigger for establishing an emergency call at a first vehicle. The method also includes determining, in response to the trigger, whether a communication system associated with the first vehicle currently has access to a first wireless communications network. The method further includes searching for a second wireless communications network when the communication system currently does not have access. The method still further includes searching for a second vehicle with peer-to-peer wireless access capability when the second wireless communications network is not found. The method also includes transmitting vehicle related data to the second vehicle via the peer-to-peer wireless access capability when the second vehicle is found.

In another aspect of the present disclosure, a non-transitory computer-readable medium with non-transitory program code recorded thereon is disclosed. The program code is executed by a processor and includes program code to receive a trigger for establishing an emergency call at a first vehicle. The program code also includes program code to determine, in response to the trigger, whether a communication system associated with the first vehicle currently has access to a first wireless communications network. The program code further includes program code to search for a second wireless communications network when the communication system currently does not have access. The program code still further includes program code to search for a second vehicle with peer-to-peer wireless access capability when the second wireless communications network is not found. The program code also includes program code to transmit vehicle related data to the second vehicle via the peer-to-peer wireless access capability when the second vehicle is found.

Another aspect of the present disclosure is directed to an apparatus. The apparatus having a memory and one or more processors coupled to the memory. The processor(s) is configured to receive a trigger for establishing an emergency call at a first vehicle. The processor(s) is also configured to determine, in response to the trigger, whether a communication system associated with the first vehicle currently has access to a first wireless communications network. The processor(s) is further configured to search for a second wireless communications network when the communication system currently does not have access. The processor(s) still further configured to search for a second vehicle with peer-to-peer wireless access capability when the second wireless communications network is not found. The processor(s) is also configured to transmit vehicle related data to the second vehicle via the peer-to-peer wireless access capability when the second vehicle is found.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
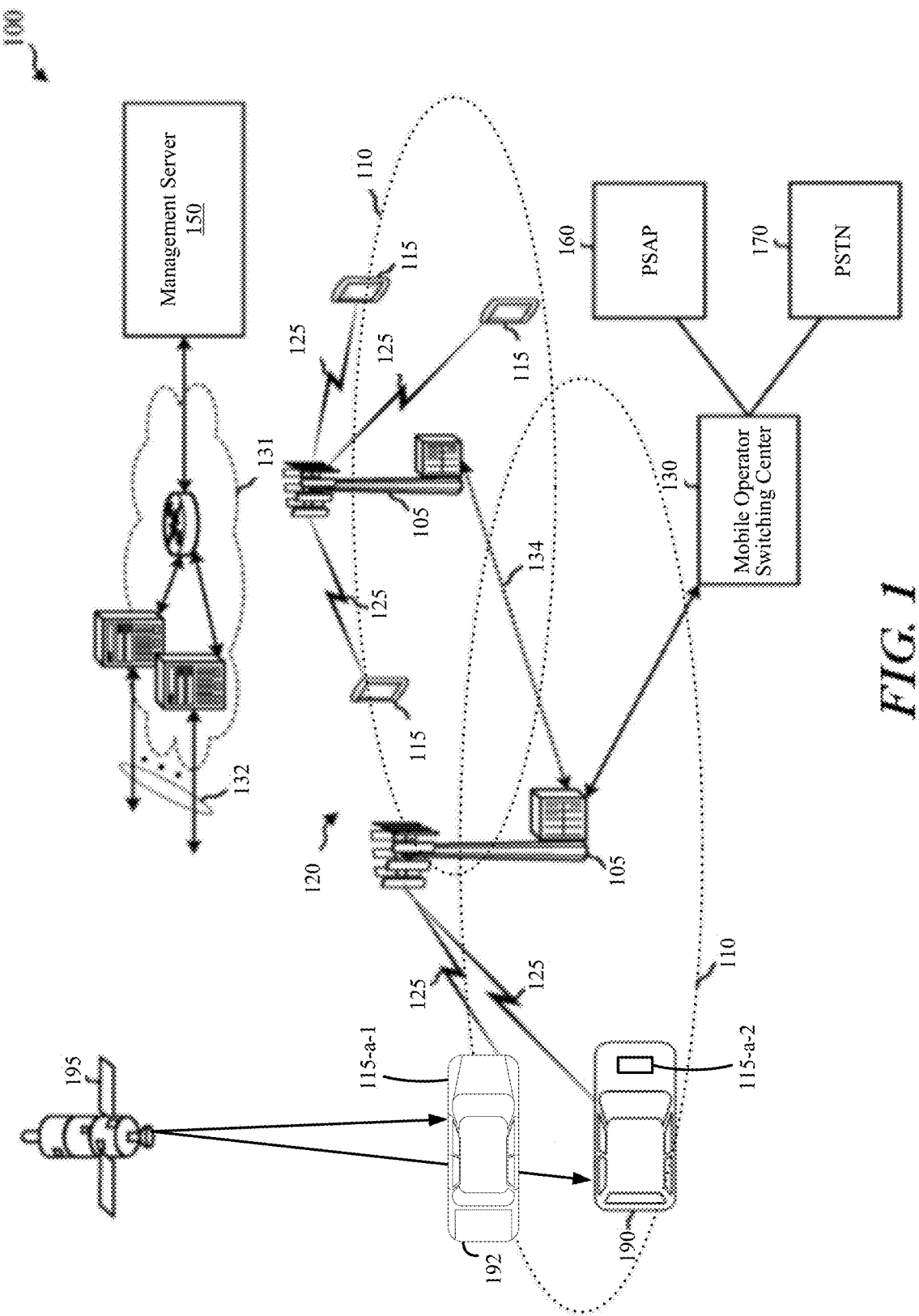
FIGS. 1 and 2 illustrate examples of a wireless communications system in accordance with aspects of the disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

As discussed, emergency call systems are intended to improve emergency assistance to vehicles. Transmission of the emergency call and the corresponding vehicle related information may be dependent on access to a cellular network. Accordingly, an emergency call may fail if the vehicle does not have access to the cellular network. In some cases, the vehicle may have access to a cellular network, however, the connection may fail or the cellular network may not have access to a public safety network. It is desirable to improve emergency call systems to mitigate an inability to transmit emergency information over a cellular network.

A user may initiate a conventional emergency call by dialing conventional emergency numbers such as "911" in North America and "112" in Europe. An eCall is a type of emergency call that is triggered by an in-vehicle system (IVS) or manually triggered by a passenger. The eCall is routed to a public safety answering point (PSAP).

In some locations, such as Europe, the term "eCall" denotes a particular kind of emergency call. In the eCall system, an in-vehicle system (IVS) dials an emergency number in the event of an accident. Specifically, the eCall may be established between an IVS and a PSAP over a wireless communications network such as a global system for mobile communications (GSM) network, a universal mobile telecommunications service (UMTS) network, a long term evolution (LTE) network, or a fifth generation (5G) network. eCall support may be regulated by regional regulating bodies, such as the European Union (EU). An eCall may be different from a conventional emergency call based on the manner in which the call is placed and the additional emergency related telematics data that may be sent to establish the eCall and used to process the eCall.

An eCall may be automatically triggered from an IVS when sensors detect an emergency situation (e.g., deployment of airbags) or manually by an occupant (e.g., driver or passenger) of the vehicle. In addition to enabling two-way speech communication between a vehicle's occupant and the PSAP operator, the IVS may transmit a data message to the PSAP, either during eCall establishment or after eCall establishment. The data message may be referred to as a minimum set of data (MSD). The MSD may include vehicle location information, timestamp information, possibly the number of passengers, vehicle identification number (VIN), and other relevant information, such as vehicle sensor data (e.g., airbag sensor data or acceleration sensor data). TABLE 1 is an example of an MSD:

TABLE 1

| | |
|---|---|
| MSD Version | 2 |
| MessageIdentifier | 1 |
| Activation | ECALL_AUTOMATIC_INITIATED |
| callType | ECALL_EMERGENCY |
| vehicleType | 1 |
| positionCanBeTrusted | FALSE |
| VIN | WM0VDSVDSYA123456 |
| gasolineTankPresent | TRUE |
| dieselTankPresent | FALSE |
| compressedNaturalGas | FALSE |
| liquidPropaneGas | FALSE |
| electricEnergyStorage | FALSE |
| hydrogenStorage | FALSE |
| otherStorage | FALSE |
| Time Stamp | 0 |
| positionLatitude | 0 |
| positionLongitude | 0 |
| vehicledirection | 0 |
| numberOfPassengers | 2 |

Following the successful transfer of the MSD, the PSAP may return metadata to the IVS, confirming the successful transfer. During the call, the PSAP may send metadata to the IVS requesting an updated MSD. The updated MSD may include, for example, a new location for the vehicle and/or an indication of a different number of vehicle occupants. The MSD and associated metadata (e.g., MSD confirmation or MSD request) may be transferred using in-band or out-of-band transmissions. The use of an in-band or out-of-band transmission may be based on whether a wireless communications system supports or does not support out-of-band transfer.

With an in-band transfer, the MSD may be transferred using the voice communications path between a user equipment (UE) and PSAP using an in-band data modem at the UE and the PSAP. At the UE, the in-band modem may encode MSD (e.g., MSD data bits) as audio signals. At the PSAP, the in-band modem may decode the audio signals into the original MSD. With out-of-band transfer, the MSD may be transmitted as part of a signaling message (e.g., a session initiation protocol (SIP) signaling message) which may be transmitted from the UE to the PSAP using the Internet Protocol (IP) and separately from the transmission of voice communication between the UE and the PSAP.

In a next generation (NG) eCall, out-of-band MSD transmissions may be used when the wireless communications system uses an IP-based network architecture such as LTE. Out-of-band MSD transmissions may be faster and more reliable in comparison to in-band MSD transmissions that use the voice media path from the IVS to the PSAP. In-band MSD transmissions may use legacy technologies such as GSM or UMTS. As discussed, out-of-band MSD transmissions (e.g., via an SIP or a separate dedicated data channel) may depend on a PSAP being IP (e.g., SIP) capable.

If both eCall over IMS and eCall over a circuit switched network (CS) are available (e.g., from one or more networks with 2G/3G and 4G access), a UE may use eCall over IMS instead of eCall over CS.

To enable eCall over IMS, both the UE side and the network side may support eCall over IMS. In particular, a network may support routing an eCall over IMS to a PSAP that: i) supports eCall over IMS; ii) interprets the telematics data (e.g., MSD), which may be included in the SIP INVITE sent by a UE to establish the eCall over IMS; and iii) supports the associated signaling (e.g., MSD acknowledgment, etc.). The network may advertise its support for eCall over IMS via a broadcast indicator included in broadcast system information (e.g., system information block (SIB)). This enables UEs to know in advance which networks (e.g., public land mobile networks (PLMNs)), support eCall over IMS, thereby avoiding delay in selecting a network that supports eCall over IMS. This may not guarantee that the PSAP will always support eCall over IMS, because it is possible that the eCall is routed by an IMS supporting network to a legacy PSAP in the CS domain that may support in-band transfer of the MSD but not IMS transfer of the MSD. However, this scenario may be rare because a network may advertise support for eCall over IMS when both the network and a PSAP to which an eCall can be routed both support eCall over IMS.

In an emergency situation, a transmission of an MSD from a mobile device (e.g., in-vehicle system) to a PSAP may be time-sensitive. As discussed, the MSD is transmitted over a cellular network. As such, failure to transmit the MSD over the cellular network may delay an emergency responder's response time.

In some cases, an IVS may fail to transmit the MSD because the vehicle may be located in an out of service (OOS) region. That is, the IVS may not be within a coverage area of a cellular network. Alternatively, the IVS may only have access to a cellular network that does not support MSD transmissions. That is, the cellular network may only support emergency voice calls.

In some cases, the PSAP may have difficulties in decoding an MSD. For example, in a deep fade channel condition, the PSAP may have trouble decoding the MSD. In another example, the eCall may fail to establish due to a missing or damaged SIM card. In accordance with the eCall specification, an eCall can only be established when a functioning SIM card is present.

The reasons for a failed MSD transmission are not limited to the aforementioned examples. The MSD transmission may fail for other reasons. Regardless of the reason, the MSD transmission failure may be detrimental to passenger safety. Aspects of the present disclosure are directed to providing alternate MSD transmission options when an IVS fails to transmit the MSD over a cellular network.

FIG. 1 illustrates an example of a wireless communications system 100 in accordance with aspects of the disclosure. As shown in FIG. 1, the wireless communications system 100 includes base stations 105, wireless devices 115, and a core network 131. The core network 131 may provide access, routing, and/or mobility functions, such as user authentication, access authorization, tracking, and/or Internet Protocol (IP) connectivity. The base stations 105 interface with the core network 131 via backhaul links 132. The base stations 105 may communicate, either directly or indirectly via the core network 131 and/or over backhaul links 132.

The base stations 105 may communicate with the wireless devices 115. Each base station 105 may provide communications coverage for a respective geographic coverage area 110. In some examples, base stations 105 may be referred to as a base transceiver station, a radio base station, an access point, a radio transceiver, a NodeB, an eNodeB (eNB), a Home NodeB, a Home eNodeB, or other suitable terminology. Additionally, or alternatively, the wireless communications system 100 may include macro or small cell base stations. The geographic coverage areas 110 may overlap.

The wireless communications system 100 may be a 5G new radio (NR) network, a long term evolution (LTE) or LTE-Advanced (LTE-A) network. The wireless communications system 100 may be a heterogeneous LTE/LTE-A network in which different types of eNBs provide coverage for various geographical regions. For example, each eNB or base station 105 may provide communications coverage for a macro cell, a small cell, or other types of cells. In other examples, the wireless communications system 100 may be a GSM network, a wideband code division multiple access (WCDMA) network, a general packet radio service (GPRS) access network, a CDMA 1× network, a high rate packet data (HRPD) network, an ultra mobile broadband (UMB) network, or generally any type of wireless communications network.

A macro cell generally covers a relatively large geographic area (e.g., several kilometers in radius) and may allow unrestricted access by UEs with service subscriptions with the network provider. A small cell is a lower-powered base station, as compared with a macro cell, which may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The wireless devices 115 are dispersed throughout the wireless communications system 100, and each wireless device 115 may be stationary or mobile. A wireless device 115 may also include or be referred to by those skilled in the art as a mobile station, a subscriber station, a mobile unit, a subscriber unit, a wireless unit, a remote unit, a mobile device, a wireless communications device, a remote device, a mobile subscriber station, an access terminal, a mobile terminal, a wireless terminal, a remote terminal, a handset, a user agent, a user equipment (UE), a mobile client, a client, or some other suitable terminology. A wireless device 115 may be a cellular phone, a personal digital assistant (PDA), a wireless modem, a wireless communications device, a handheld device, a tablet computer, a laptop computer, a cordless phone, a wireless local loop (WLL) station, or the like. A wireless device may be able to communicate with various types of base stations and network equipment, including macro eNBs, small cell eNBs, relay base stations, and the like.

Communications links 125 may include uplink (UL) transmissions from a wireless device 115 to a base station 105, or downlink (DL) transmissions, from a base station 105 to a wireless device 115. The downlink transmissions may also be called forward link transmissions, while the uplink transmissions may also be called reverse link transmissions. Each communications link 125 may include one or more carriers, where each carrier may be a signal comprised of multiple sub-carriers (e.g., waveform signals of different frequencies) modulated according to the various radio technologies described above. Each modulated signal may be transmitted on a different sub-carrier and may carry control information (e.g., reference signals, control channels, etc.), overhead information, user data, etc. The communications links 125 may transmit bidirectional communications using frequency division duplex (FDD) operation (e.g., using paired spectrum resources) or time division duplex (TDD) operation (e.g., using unpaired spectrum resources). Frame structures for FDD (e.g., frame structure type 1) and TDD (e.g., frame structure type 2) may be defined.

In some embodiments of the wireless communications system 100, base stations 105 or wireless devices 115 may include multiple antennas for employing antenna diversity schemes to improve communication quality and reliability between base stations 105 and wireless devices 115. Additionally or alternatively, base stations 105 or wireless devices 115 may employ multiple-input, multiple-output (MIMO) techniques that may take advantage of multi-path environments to transmit multiple spatial layers carrying the same or different coded data.

The wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A wireless device 115 may be configured with multiple downlink CCs and one or more uplink CCs for carrier aggregation. Carrier aggregation may be used with both FDD and TDD component carriers.

The wireless communications system 100 may include a management server 150 that may be connected to the base stations 105 (e.g., connected to a radio network associated with the base stations 105) through the core network 131. The management server 150 may receive information from the base stations 105 to perform various types of operations (e.g., calculations) described herein.

As illustrated in FIG. 1, a number of different wireless devices 115-a-1, 115-a-2 may initiate wireless emergency calls over communications links 125 with a nearby base station 105. One of the wireless devices may be a first in-vehicle transmitter 115-a-1 (e.g., an in-vehicle system (IVS)) of a first vehicle 192 or another type of UE that is configured to transmit telematics data to a public safety answering point (PSAP) 160 (or to a public switched telephone network (PTSN) 170) via a communication session signaling protocol before, during, or after an emergency call initiated by a caller of the first in-vehicle transmitter 115-a-1. Another of the wireless devices may be a second in-vehicle transmitter 115-a-2. The second in-vehicle transmitter 115-a-2 may transmit telematics data to the PSAP 160 via a communication session signaling protocol before, during, or after an emergency call initiated by a second vehicle 190. In some embodiments, circuit-switched telephony may be used to exchange the telematics data via a voice channel established between the in-vehicle transmitters 115-a-1, 115-a-2 and the PSAP 160. Such an exchange may be facilitated by a mobile operator switching center 130.

Telematics data refers to data generated, collected, or stored at a device (such as the vehicles 190, 192) for transmission to the PSAP 160 for processing. Telematics data may include, but is not limited to, diagnostics data, location data, data identifying and/or describing a source device or the user of the source device (e.g., data identifying a vehicle, make of vehicle, a user, or certain conditions of a user such as known medical problems), sensor data, and the like. The recipient of telematics data may be another device (e.g., a PC, laptop, mobile phone, or another central service) that is from a PSAP or belonging to a PSAP. The recipient may store the telematics data, process the telematics data, and/or forward the telematics data to another entity, such as the PSAP 160.

The mobile operator switching center 130 may include a visitor location register (VLR), a mobile switching center (MSC) as defined by 3GPP, or other network entities (not shown in FIG. 1). The mobile operator switching center 130 may receive emergency and other calls from wireless devices 115 and route calls to either the PSAP 160 or a public switched telephone network (PSTN) 170. The mobile operator switching center 130 may also route packet-based requests and transmissions to and from the wireless device 115.

The PSAP 160 may also be referred to as a central service, or an emergency center (EC), and may be operated or owned by or on behalf of a government (e.g., city, state, or federal) agency. The PSTN 170 may provide telephone services for conventional wireline telephones.

The wireless devices 115, including the in-vehicle transmitters 115-a-1, 115-a-2 may have a service subscription with a home wireless network. The home wireless network may be the same as the serving wireless network or different. The subscription data may be stored, for example, at the mobile operator switching center 130 and/or the management server 150, in the case that the home wireless network is the same as the serving wireless network. The subscription data may be transferred to the mobile operator switching center 130 or the management server 150 by the home wireless network when it is not the same as the serving wireless network.

The wireless devices 115, including the in-vehicle transmitters 115-a-1, 115-a-2 may also receive signals from one or more satellites 195 or other positioning devices, which may be part of a satellite positioning system (SPS) or other positioning systems. This may enable the wireless device 115 to compute and maintain an accurate estimate of its current location or to obtain an accurate location estimate when the wireless device 115 makes an emergency call. An SPS may include a system of transmitters positioned to enable entities to determine their location on or above the Earth-based on signals received from the transmitters.

In a particular example, such transmitters may be located on Earth-orbiting satellite vehicles (SVs). For example, a SV in a constellation of global navigation satellite system (GNSS) such as global positioning system (GPS), Galileo, Glonass, or Compass may transmit a signal marked with a pseudo-random noise (PN) code that is distinguishable from PN codes transmitted by other SVs in the constellation (e.g., using different PN codes for each satellite as in GPS or using the same code on different frequencies as in Glonass). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., or various augmentation systems (e.g., a satellite based augmentation system (SBAS)) that may be associated with or otherwise enabled for use with one or more global or regional navigation satellite systems.

By way of example but not limitation, an SBAS may include an augmentation system(s) that provides integrity information, differential corrections, etc., such as, e.g., wide area augmentation system (WAAS), European Geostationary Navigation Overlay Service (EGNOS), multi-functional satellite augmentation system (MSAS), GPS aided geo augmented navigation or GPS and geo augmented navigation system (GAGAN), or the like. Thus, as used herein, an SPS may include any combination of one or more global or regional navigation satellite systems or augmentation systems, and SPS signals may include SPS, SPS-like, or other signals associated with such one or more SPS.

The wireless devices 115 may measure signals from satellites 195 and obtain pseudo-range measurements. The wireless devices 115 may also measure signals from base stations 105 to obtain timing or signal strength measurements. The pseudo-range measurements, timing measurements, and/or signal strength measurements may be used to derive an estimated location for the wireless devices 115. The location derived by the wireless devices 115 may be transmitted as telematics data to the PSAP 160 during an emergency call.

Each of the wireless devices 115 may include a device identifier, such as an international mobile equipment identity (IMEI), which is a unique number assigned to the device. The wireless devices 115 may be used for a service subscription of a user. The service subscription may be associated with a subscriber identifier, such as an international mobile subscriber identity (IMSI), which is a unique number assigned to a subscription for cellular networks such as GSM, WCDMA, LTE, and cdma2000 1× networks. The service subscription may also be associated with a mobile subscriber integrated services digital network number (MSISDN), which is a telephone number for the service subscription. The IMSI or MSISDN may be used as a key for the service subscription in a subscriber database (e.g., a subscriber database in the home wireless network for a subscriber). The MSISDN may be dialed by other users to connect calls to, for example, the first in-vehicle transmitter 115-*a*-1 used for the service subscription. The IMSI, the MSISDN, or other subscription information may be stored in a subscriber identity module (SIM) or a universal subscriber identity module (USIM), which may be inserted into each device 115. The devices 115 may alternatively have no SIM/USIM, in which case the device 115 may have only an IMEI but no IMSI or MSISDN. Further, rather than using a unique identifier for the device, a model number or the like may indicate the capabilities of a particular model of devices.

The devices 115 may support one or more different types of emergency calls, which may or may not be associated with well-known emergency numbers such as 911 in North America and 112 in Europe. As discussed, an eCall is one type of emergency call. During an eCall, telematics data can be transmitted to the PSAP 160 in addition to supporting voice or other media communication between the caller and the PSAP 160. Support for eCalls may be required by the European Union and by other world regions or countries. The telematics data in an eCall may be transferred within a voice channel or via a communication session signaling protocol, and may include one or more parameters, such as a location of the caller, how the eCall was initiated (e.g., whether manually by a user or automatically in response to sensor data or a sensor trigger), an identification number (VIN, IMEI, IMSI, etc.), a timestamp, and possibly other information.

Before, during, or after the establishment of an emergency call with the PSAP 160, at least some of the devices 115 may transmit information that distinguishes a personal telematics-enhanced emergency call from other types of emergency calls, such as non-telematics-enhanced emergency calls, vehicular emergency calls initiated by the in-vehicle transmitter 115-*a*-2, and so forth. The information may be a specific indication of a personal eCall, for example, indicating the capability of the personal eCall (e.g., telematics-enhanced or not), or may be information that is transmitted for some other purpose or function (e.g., registration or authentication), or may be information provided in response to a request or instruction (e.g., how the UE subscribes, attaches or initiates a call, such as alternate or additional forms of a registration ID, or a token provided when registering, attaching or initiating a call), or may be information provided a priori to a service provider or PSAP (e.g., prior to establishing the emergency call), information included in data or media sent to the PSAP (e.g., a flag or token identifying a next-generation call, or a dual tone multi-frequency (DTMF) or audio indication in a circuit-switched call).

The enablement of such information may be behavioral as well as transactional, explicit or implicit, and may occur as part of emergency call establishment or prior. Further, such information may be enabled by the service provider (e.g., carrier), for example, with the service provider determining that the UE supports telematics enhancements based on how the UE subscribed, attached or initiated the call, or by accessing a database including information for the UE (e.g., an ID associated with the UE, such as an IMEI, a model number, an IMSI, etc.) The service provider may enable the information by informing the PSAP that the UE has such capability. The information may be enabled by the PSAP as well, for example, by querying the UE, accessing a database, etc. Thus, the information may include, for example, a type of emergency call, a type of UE, capabilities of the UE, a subscriber ID, or generally any information that may be used as described herein.

Figure 2:
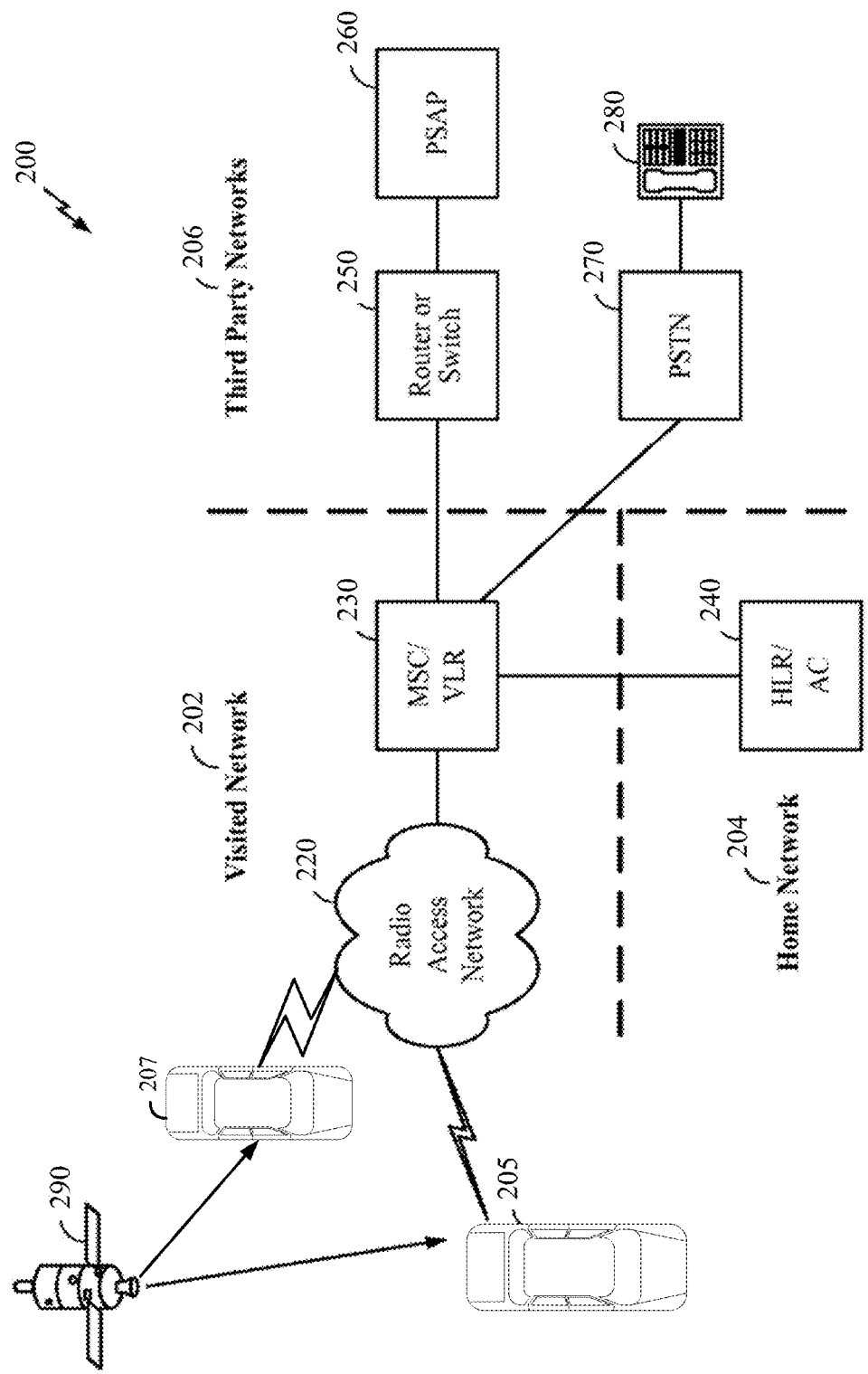

FIG. 2 illustrates an example wireless communications system 200 according to aspects of the present disclosure. As shown in FIG. 2, the wireless communications system 200 may include a visited network 202, a home network 204, and third party networks 206. Visited network 202 may also be referred to as a visited public land mobile network (V-PLMN), a serving network, etc. The home network 204 may also be referred to as a home PLMN (H-PLMN). The visited network 202 may be a serving network for one or more vehicles 205, 207, which may be roaming from its home network 204, as assumed in much of the description below. Each vehicle 205, 207 may include an IVS. The visited network 202 and home network 204 may be the same network if the vehicles 205, 207 are not roaming. The wireless communications system 200 may be applicable to an eCall over CS.

The visited network 202 may include a radio access network (RAN) 220, a mobile switching center (MSC)/visitor location register (VLR) 230 (which is also referred to as MSC 230), and other network entities not shown for simplicity. The visited network 202 may comprise one or more of a global system for mobile communications (GSM) network, a wideband code division multiple access (WCDMA) network, a general packet radio service (GPRS) access network, a long term evolution (LTE) network, a code division multiple access (CDMA) 1× network, a high rate packet data (HRPD) network, an ultra mobile broadband (UMB) network, a 5G NR network, etc. GSM, WCDMA, GPRS, LTE, and NR are described in documents from an organization named "3rd Generation Partnership Project" (3GPP). CDMA 1× and HRPD are part of cdma2000, and cdma2000 and UMB are described in documents from an organization named "3rd Generation Partnership Project 2" (3GPP2). RAN 220 may be a GSM edge radio access network (GERAN), a universal terrestrial radio access network (UTRAN) or evolved UTRAN (E-UTRAN). MSC 230 may perform switching functions for circuit-switched calls and may also route short message service (SMS) messages. VLR 230 may store registration information for terminals that have registered with visited network 202.

The home network 204 may include a home location register (HLR)/authentication center (AC) 240 and other network entities not shown for simplicity. HLR 240 may store subscription information for terminals, such the vehicles 205, 207, that have a service subscription with the home network 204. AC 240 may perform authentication for terminals having service subscription with the home network 204.

Third party networks 206 may include a selective router 250 (e.g., a PSAP selective router), a PSAP 260, a public switched telephone network (PSTN) 270, and possibly other network entities not shown in FIG. 2. The selective router 250 may route calls between MSC 230 and PSAP 260. PSAP 260 may be responsible for answering emergency calls and may also be referred to as an emergency center (EC). The PSAP 260 may be operated or owned by a government agency (e.g., a county or city). The PSTN 270 may provide telephone services for conventional wireline telephones, such as a telephone 280.

FIG. 2 provides examples of some network entities that may be present in the visited network 202 and the home network 204. For example, the visited network 202 may include network entities supporting packet-switched calls and other services as well as a location server to assist in obtaining a terminal location.

The vehicles 205, 207 may be also be referred to as a mobile station (MS) in GSM and CDMA 1×, a UE in WCDMA and LTE, an access terminal (AT) in HRPD, a SUPL enabled terminal (SET) for secure user plane location (SUPL), a subscriber unit, a station, a terminal, etc. Other types of devices are also contemplated, such as a cellular phone or other wireless communications device, personal communications system (PCS) device, personal navigation device (PND), personal information manager (PIM), personal digital assistant (PDA), laptop computer, tablet computer, or other suitable mobile device that is capable of receiving wireless communications and/or navigation signals. The vehicles 205, 207 may also communicate with a PND, such as by short-range wireless, infrared, wireline, or other connection—regardless of whether satellite signal reception, assistance data reception, and/or position-related processing occurs at the device or at the PND.

The vehicles 205, 207 may include other types of communication devices, including wireless communications devices, computers, laptops, etc., that are capable of communications with a server, such as via the Internet, Wi-Fi, or other networks, and regardless of whether satellite signal reception, assistance data reception, and/or position-related processing occurs at the device, at a server, or at another device associated with the network.

The vehicles 205, 207 may have a service subscription with the home network 204 and may be roaming in the visited network 202, as shown in FIG. 2. The vehicles 205, 207 may receive signals from the RAN 220 in the visited network 202 or may communicate with the RAN 220 to obtain communications services. The vehicles 205, 207 may also communicate with the home network 204 for communications services when not roaming (not shown in FIG. 2).

The vehicles 205, 207 may receive signals from one or more space vehicles (SVs) 290, which may be part of a satellite positioning system (SPS). An SPS typically includes a system of transmitters positioned to enable entities to determine their location on or above the Earth based, at least in part, on signals received from transmitters of the one or more SVs 290. Such transmitters typically transmit a signal marked with a repeating pseudo-random noise (PN) code of a set number of chips and may be located on ground based control stations, the UE, and/or space vehicles. In a particular example, such transmitters may be located on Earth orbiting SVs 290. For example, an SV 290 in a constellation of a global navigation satellite system (GNSS), such as the global positioning system (GPS), Galileo, GLONASS, or Beidou, may transmit a signal marked with a PN code that is distinguishable from PN codes transmitted by other SVs 290 in the constellation (e.g., using different PN codes for each satellite as in GPS or using the same code on different frequencies as in GLONASS). The vehicles 205, 207 may use measurements from SVs 290 to maintain an accurate current location of vehicles 205, 207 and may include this location (e.g., latitude and longitude coordinates) in any telematics data (e.g., MSD) that is sent to PSAP 260 in association with an eCall.

In accordance with certain aspects of the disclosure, the techniques presented are not restricted to global systems (e.g., GNSS) for SPS. For example, the techniques provided herein may be applied to or otherwise enabled for use in various regional systems, such as, e.g., the Quasi-Zenith Satellite System (QZSS) over Japan, the Indian Regional Navigational Satellite System (IRNSS) over India, etc., and/or various augmentation systems (e.g., a satellite based augmentation system (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., wide area augmentation system (WAAS), European Geostationary Navigation Overlay Service (EGNOS), multi-functional satellite augmentation system (MSAS), GPS aided geo augmented navigation or GPS and Geo augmented navigation system (GAGAN), and/or the like.

Thus, as used herein, an SPS may include any combination of one or more global and/or regional navigation satellite systems and/or augmentation systems, and SPS signals may include SPS, SPS-like, and/or other signals associated with such one or more SPS. The vehicles 205, 207 may measure signals from SVs 290 and obtain pseudorange measurements for the SVs 290. The vehicles 205, 207 may also measure signals from base stations in RAN 220 and obtain timing and/or signal strength measurements for the base stations. The pseudo-range measurements, timing measurements, and/or signal strength measurements may be used to derive a position estimate for the vehicles 205, 207.

As discussed, in an emergency situation, transmission of an MSD from a mobile device (e.g., IVS) to a PSAP may be time-sensitive. Failure to transmit the MSD over the cellular network may delay an emergency responder's response time. Aspects of the present disclosure are directed to providing alternate MSD transmission options when an IVS fails to transmit the MSD over a cellular network.

In one configuration, upon MSD transmission failure over a cellular network, the IVS searches for vehicles within range of the IVS. The IVS transmits the MSD to the identified vehicle(s) via a peer-to-peer transmission technology, such as cellular vehicle-to-everything (CV2X) technology. In this configuration, the MSD transmission failure may be due to lack of coverage, lack of network support, and/or other reasons.

The IVS may identify other vehicles (e.g., other UEs) via proximity services during a discovery phase. In the discovery phase, each UE broadcasts its available services. Accordingly, during the discovery phase, the IVS may identify vehicles that support MSD forwarding.

In one configuration, there is a limit on a number of vehicles that can receive the MSD from an IVS. For example, if a vehicle is in an emergency situation on a busy road, network bandwidth may be degraded if the IVS transmits the MSD to all of the other vehicles on the road. Thus, the IVS may be limited to transmitting the MSD to a subset of all vehicles within a given vicinity.

The MSD transmitted by the IVS may include a unique identifier to distinguish the MSD from other MSDs. For example, the unique identifier may include one or more of a vehicle identification number (VIN), a mobile station international subscriber directory number (MSISDN), a user ID, a message ID assigned by the IVS, and one or more other identifiers. Distinguishing the MSDs reduces a possibility of dispatching an emergency responder to an emergency when another emergency responder has already been dispatched to the same emergency.

The receiving vehicle forwards the received MSD to the PSAP via a cellular network if the receiving vehicle is connected to the cellular network. If the receiving vehicle is not connected to the cellular network, the receiving vehicle transmits the MSD as soon as it connects to the cellular network. In one configuration, a receiving vehicle continuously or periodically attempts to transmit the MSD to the PSAP.

Additionally, or alternatively, if the receiving vehicle is not connected to a cellular network, the receiving vehicle may forward the MSD to another vehicle for forwarding to a PSAP. The MSD may be forwarded until the MSD is transmitted to the PSAP. The MSD may be transmitted between vehicles via a peer-to-peer network (e.g., CV2X).

The transmission attempts may continue indefinitely or until a condition is satisfied. For example, the transmission attempts may continue until a maximum retry timer expires. In one configuration, after transmitting the MSD, the receiving vehicle initiates the maximum retry timer.

Upon successfully receiving and decoding the MSD, the PSAP transmits an ACK to the receiving vehicle (e.g., the vehicle that transmitted the MSD). In one configuration, the PSAP compares the message ID or content to detect and filter duplicate MSDs. The PSAP alerts responders based on the MSD content if the MSD is not a duplicate. Alternatively, the PSAP discards the MSD if it is a duplicate.

After receiving the ACK from the PSAP, the receiving vehicle discards the MSD. Alternatively, upon the expiration of a receiving vehicle's maximum retry timer, the receiving vehicle discards the MSD. As discussed, the receiving vehicle may continue MSD transmission attempts until the expiration of the receiving vehicle's maximum retry timer.

Figure 3:
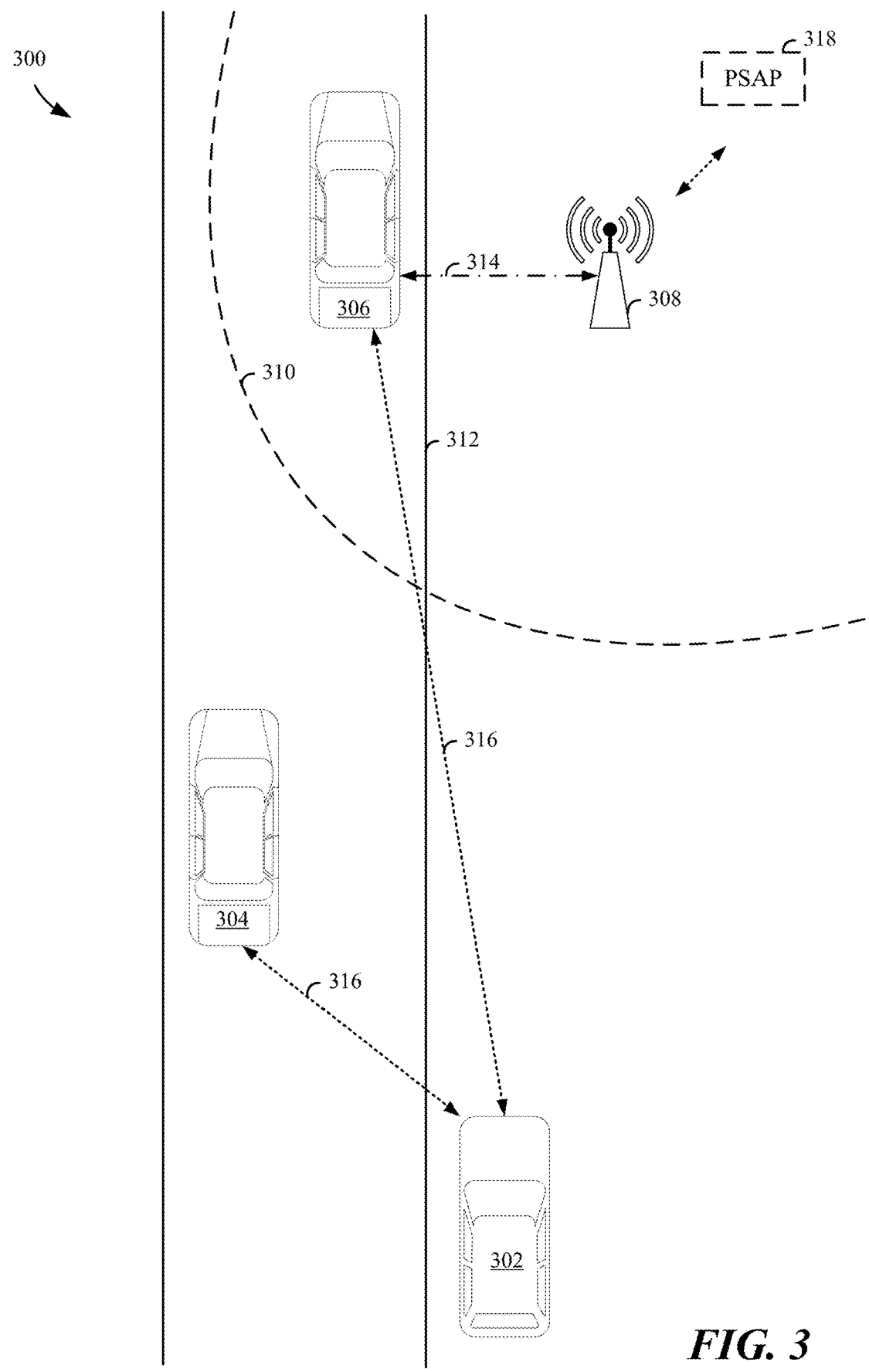
FIG. 3 illustrates an example of transmitting vehicle related data to a public safety answering point in accordance with aspects of the disclosure.

FIG. 3 illustrates an example 300 of transmitting an MSD according to aspects of the present disclosure. As shown in FIG. 3, a first vehicle 302 is parked on a shoulder of a road 312. In the example of FIG. 3, an emergency call has been triggered based on an emergency situation. In response to the triggered emergency call, an IVS (not shown in FIG. 3) of the first vehicle 302 attempts to connect to a cellular network 308 to transmit emergency call data (e.g., an MSD). In the current example, the emergency call is an eCall. Other types of emergency calls are also contemplated.

The eCall may be triggered by one or more vehicle sensors or a passenger. For example, an airbag sensor may trigger the eCall if one or more airbags are deployed. As another example, a passenger may trigger an eCall, via user input, in response to an emergency (e.g., illness, collision, etc.)

In response to the triggered eCall, the IVS determines if it is connected to a cellular network 308. If the IVS is connected to the cellular network 308, the IVS follows legacy behavior to transmit the MSD to a PSAP 318 via the cellular network 308. In the example of FIG. 3, the first vehicle 302 is in an out of service region. That is, the IVS (e.g., of the first vehicle 302) is not within a cellular network coverage area 310. As such, the IVS of the first vehicle 302 is not connected to the cellular network 308.

In one configuration, if the IVS of the first vehicle 302 is not connected to the cellular network 308, the IVS searches for the cellular network 308. If the IVS finds the cellular network 308, the IVS connects to the cellular network 308 and follows legacy behavior to transmit the MSD to the PSAP 318 via the cellular network 308. In the current example of FIG. 3, the IVS of the first vehicle 302 cannot find the cellular network 308 because it is out of the cellular network coverage area 310.

When the IVS cannot connect to a cellular network, the IVS may initiate a fallback procedure for sending the MSD. In one configuration, when the IVS cannot connect to a cellular network, the IVS searches for other vehicles 304, 306 within a given vicinity of the first vehicle 302. Additionally, or alternatively, the IVS searches for other vehicles 304, 306 if the IVS is connected to the cellular network 308 and MSD transmission over the cellular network 308 is unsuccessful (e.g., the PSAP 318 sends a NACK or does not send an ACK).

The IVS of the first vehicle 302 may search for other vehicles 304, 306 that are capable of CV2X communications. The CV2X communications capabilities of the other vehicles 304, 306 may be previously known to the IVS due to broadcast messages transmitted from the other vehicles 304, 306. Additionally, or alternatively, the IVS may transmit pinging messages to identify the other vehicles 304, 306 with CV2X communications capabilities. In the example of FIG. 3, the other vehicles 304, 306 are capable of sending and receiving data via CV2X transmissions 316.

In one configuration, the IVS of the first vehicle 302 transmits the MSD to the other vehicles 304, 306 via CV2X transmissions 316. The IVS may also transmit a unique message ID. Additionally, or alternatively, the MSD may include one or more unique identifiers. Upon receipt of the MSD, the other vehicles 304, 306 attempt to transmit (e.g., forward) the received MSD to the PSAP 318 via the cellular network 308. In FIG. 3, the second vehicle 304 is not in the cellular network coverage area 310. As such, the second vehicle 304 will search for the cellular network 308. The second vehicle 304 may continuously or periodically search for the cellular network 308. In one configuration, the second vehicle 304 initiates a maximum retry timer because the second vehicle 304 is not connected to the cellular network.

In the example of FIG. 3, the third vehicle 306 is within the cellular network coverage area 310 and is connected to the cellular network 308. As such, in response to receiving the MSD from the first vehicle 302, the third vehicle 306 forwards the MSD to the PSAP 318 via a transmission 314 to the cellular network 308. The cellular network 308 may communicate with the PSAP 318 via a switch operator (see FIGS. 1-2). In the example of FIG. 3, the MSD forwarded by the other vehicles 304, 306 refers to the MSD transmitted to the other vehicles 304, 306 via the CV2X transmissions 316 from the first vehicle 302.

After receiving and successfully decoding the forwarded MSD, the PSAP 318 transmits an ACK to the third vehicle 306 via the cellular network 308. The PSAP 318 may transmit a NACK to the third vehicle 306 if the MSD is not successfully decoded. The third vehicle 306 may re-attempt the forwarding if a NACK is received. If the PSAP 318 successfully decodes the MSD received from the third vehicle 306, the PSAP 318 acts on the MSD (e.g., dispatches emergency responders).

After receiving the ACK from the PSAP 318, the third vehicle 306 discards the MSD. Additionally, upon expiration of a maximum retry timer, the second vehicle 304 discards the MSD. As shown in FIG. 3, the second vehicle 304 is traveling towards the coverage area 310 and may eventually connect to the cellular network 308. If the maximum retry timer has not expired when the second vehicle 304 connects to the cellular network 308, the second vehicle 304 forwards the MSD to the PSAP 318 via the cellular network 308. In the current example, the second vehicle 304 would forward the MSD to the PSAP 318 after the third vehicle 306 has forwarded the MSD to the PSAP 318.

The PSAP 318 may compare unique identifiers of the MSD from the second vehicle 304 with unique identifiers of the MSD from the third vehicle 306 to determine if the MSDs are duplicates. If the MSD from the second vehicle 304 is a duplicate, the PSAP 318 ignores the duplicate MSD. If the MSD from the second vehicle 304 is different from the MSD from the third vehicle 306, the PSAP 318 acts on the MSD.

Figure 4:
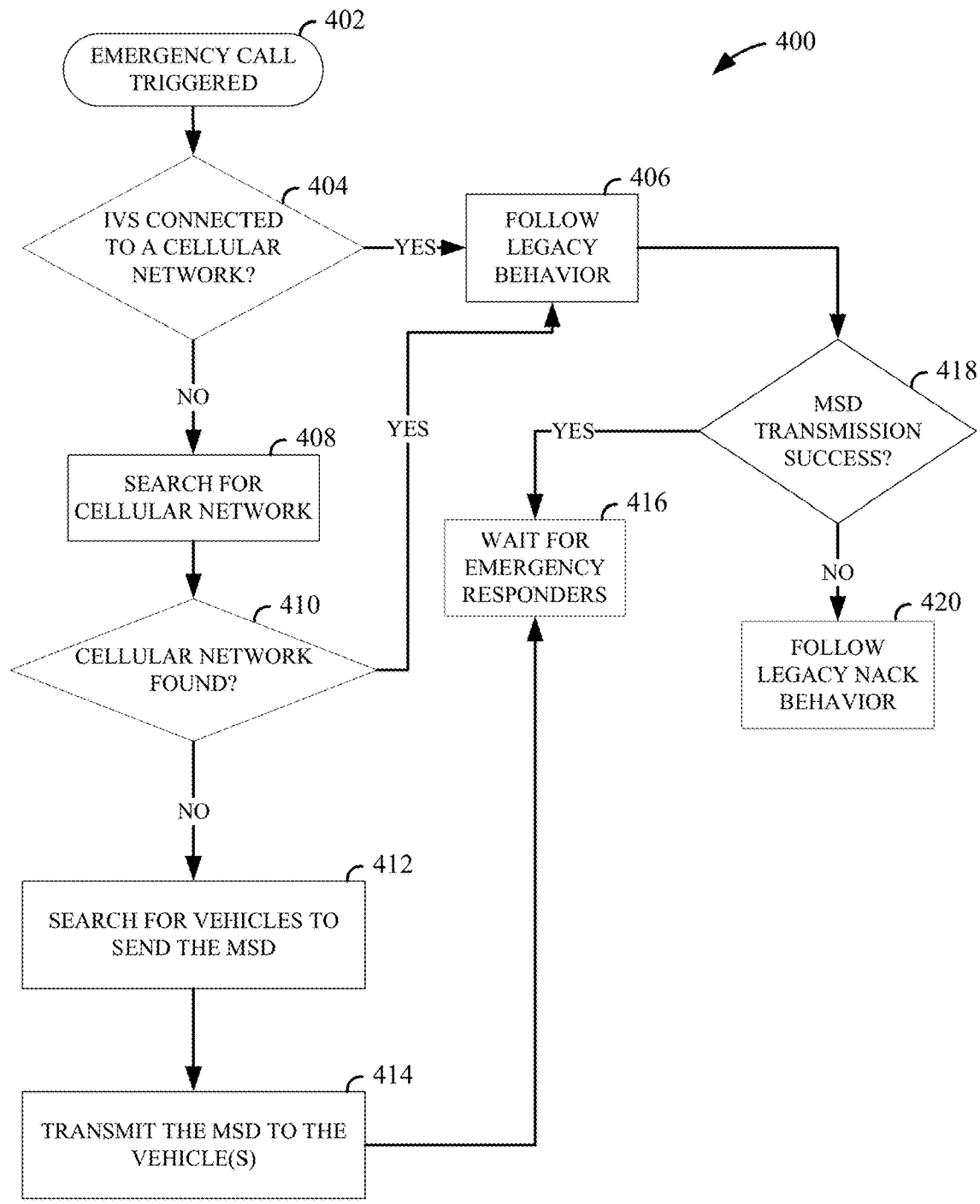
FIG. 4 illustrates a flow diagram for transmitting vehicle related data in accordance with aspects of the disclosure.

FIG. 4 illustrates a flow diagram 400 for transmitting an MSD from an IVS according to aspects of the present disclosure. As shown in FIG. 4, at block 402, an emergency call is triggered in response to an emergency situation. In response to the triggered emergency call, the IVS of a vehicle involved in the emergency situation determines if the IVS is connected to a cellular network (block 404). In the current example, the emergency call is an eCall. Other types of emergency calls are also contemplated. The eCall may be triggered by one or more vehicle sensors or a passenger. For example, an impact sensor may trigger the eCall if a collision is detected. As another example, a passenger may trigger an eCall in response to an emergency.

If the IVS is connected to the cellular network, the IVS follows legacy behavior to transmit the MSD to a PSAP via the cellular network (block 406). If the IVS is not connected to the cellular network, the IVS searches for the cellular network (block 408). At block 410, the IVS determines whether a cellular network was found. If a cellular network is found, the IVS connects to the cellular network and follows legacy behavior to transmit the MSD to the PSAP via the cellular network (block 406).

When the IVS cannot find to a cellular network, the IVS may initiate a fallback procedure for sending the MSD. In one configuration, when the IVS cannot connect to a cellular network, the IVS searches for vehicles to send the MSD (block 412). The vehicles may be within a given vicinity of the IVS. The vicinity may be based on a communications range of the IVS. For example, the vicinity may be based on a range of CV2X transmissions.

At block 414, the IVS transmits the MSD to the identified vehicles. The IVS may be transmitted to the identified vehicles via a peer-to-peer network, such as a CV2X network. The transmitted MSD may be forwarded to a PSAP by one or more of the identified vehicles (e.g., receiving vehicles). After transmitting the MSD to the identified vehicles, the IVS waits for emergency responders (block 416).

As shown in FIG. 4, after following the legacy procedure (block 406), the IVS determines if the MSD was successfully transmitted (block 418). The PSAP transmits an ACK when an MSD is successfully transmitted. Alternatively, the PSAP transmits a NACK when the MSD is unsuccessfully transmitted. If the MSD was successfully transmitted (e.g., an ACK was received) the IVS waits for emergency responders (block 416). If the MSD was unsuccessfully transmitted (e.g., a NACK was received), the IVS follows legacy NACK behavior (block 420). The legacy NACK behavior may include re-transmitting the MSD.

Figure 5:
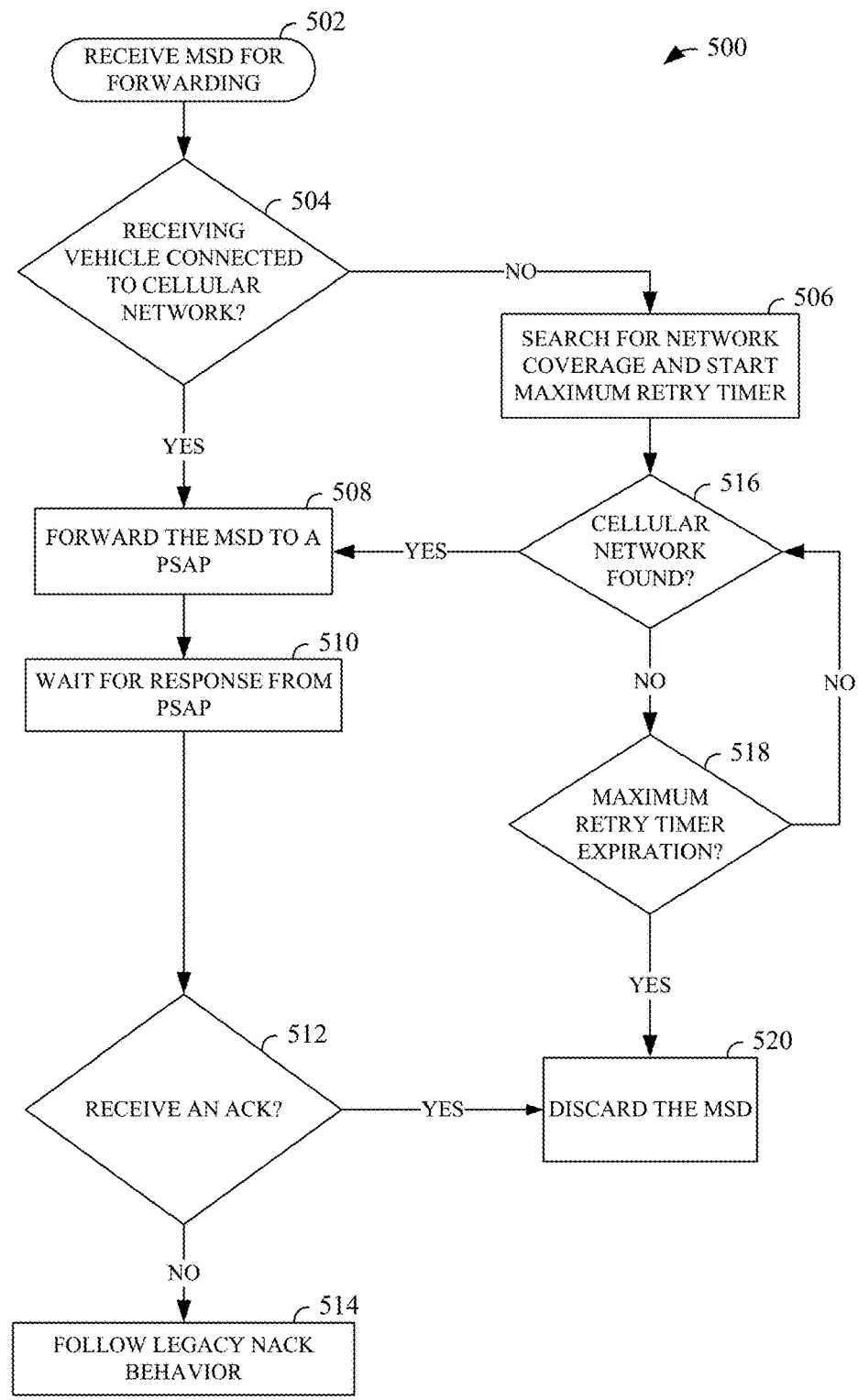
FIG. 5 illustrates a flow diagram for forwarding vehicle related data in accordance with aspects of the disclosure.

FIG. 5 illustrates an example 500 of forwarding an MSD received from an IVS according to aspects of the present disclosure. As shown in FIG. 5, at block 502, a vehicle (e.g., receiving vehicle) receives an MSD for forwarding. The MSD may be received from an IVS of a vehicle associated with an emergency situation. The MSD is intended to be forwarded to a PSAP. Upon receipt of the MSD, the receiving vehicle attempts to transmit the received MSD to a PSAP via a cellular network. At block 504, the receiving vehicle determines if it is connected to a cellular network.

If the receiving vehicle is not connected to the cellular network, the receiving vehicle initiates a maximum retry timer and begins to search for the cellular network (block 506). The receiving vehicle may continuously or periodically search for the cellular network. After initiating the maximum retry timer, the receiving vehicle determines whether a network is found (block 516).

If the receiving vehicle finds a network, the MSD is forwarded to the PSAP (block 508). If a network is not found, the receiving vehicle determines whether a maximum retry timer has expired (block 518). If the timer has not expired, the receiving vehicle continues a loop of determining whether a network has been found (block 516). If the timer has expired, the receiving vehicle discards the MSD (block 520).

Alternatively, if the receiving vehicle is connected to the cellular network, in response to receiving the MSD from the IVS, the receiving vehicle forwards the MSD to the PSAP via a transmission to the cellular network (block 508). After forwarding the MSD, the receiving vehicle waits for a response from the PSAP (block 510). At block 512, the receiving vehicle determines whether it received an ACK in response to the PSAP transmission.

The PSAP transmits an ACK if the MSD was successfully received and decoded. The PSAP may transmit a NACK if the MSD is not successfully received or decoded. If the receiving vehicle receives an ACK, the receiving vehicle discards the MSD (block 520). If an ACK is not received, the receiving vehicle may follow legacy NACK behavior (block 514). For example, the receiving vehicle may re-attempt to forward the MSD if a NACK is received.

Figure 6:
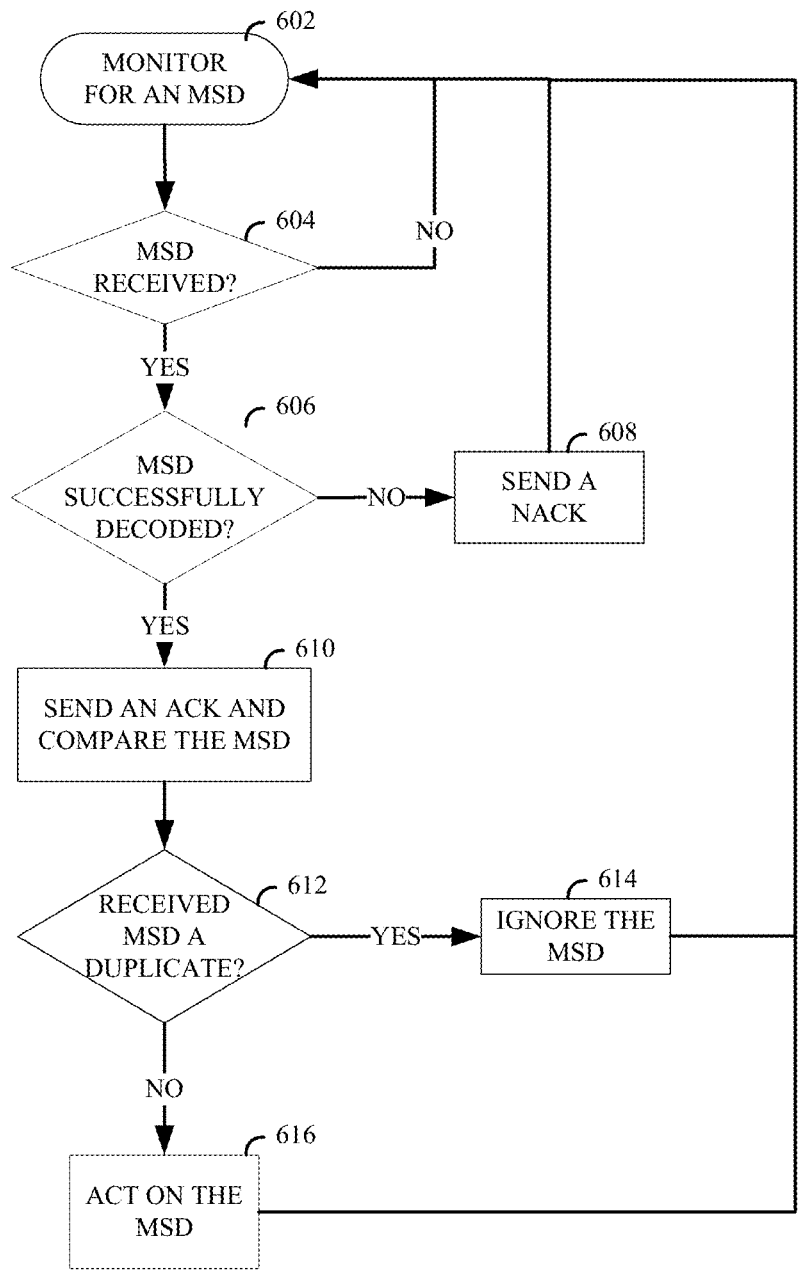
FIG. 6 illustrates a flow diagram for receiving vehicle related data in accordance with aspects of the disclosure.

FIG. 6 illustrates a flow diagram 600 for receiving an MSD at a PSAP according to aspects of the present disclosure. As shown in FIG. 6, at block 602, the PSAP monitors for an MSD. At block 604, the PSAP determines whether an MSD was received. If the MSD was not received, the PSAP continues to monitor for the MSD (block 602). Upon receiving an MSD, the PSAP attempts to decode the MSD. At block 606, the PSAP determines if the MSD was successfully decoded. If the MSD was unsuccessfully decoded, the PSAP transmits a NACK (block 608) and monitors for another MSD (block 602).

If the MSD was successfully decoded, the PSAP transmits an ACK and compares the MSD to other received MSDs (block 610). The PSAP may compare one or more unique identifiers of the MSDs, such as a VIN and another identifier. At block 612, based on the comparison, the PSAP determines if the received MSD is a duplicate. If the MSD is a duplicate, the PSAP ignores the MSD (block 614) and then monitors for another MSD (block 602). If the MSD is not a duplicate, the PSAP acts on the MSD (block 616) and then monitors for another MSD (block 602). The PSAP may act on the MSD by dispatching emergency responders to the location of the emergency. The location may be determined from location information included in the MSD.

Aspects of the present disclosure are not limited to an eCall. Aspects of the present disclosure may be used for other applications, such as an emergency call with only voice and/or text.

Figure 7:
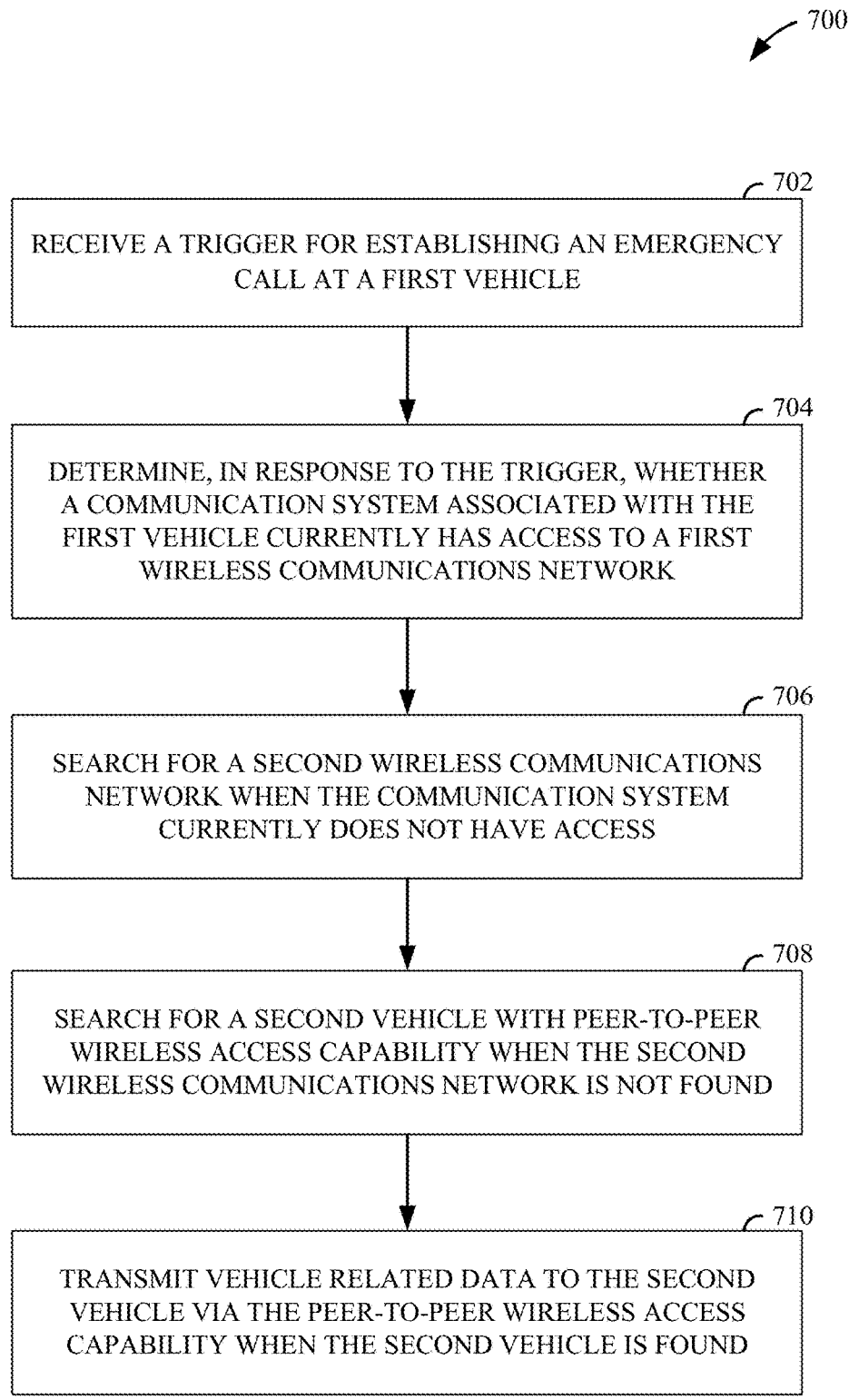
FIG. 7 illustrates a flow diagram for a method in accordance with aspects of the present disclosure.

FIG. 7 illustrates a flow diagram for a method 700 according to an aspect of the present disclosure. As shown in FIG. 7, at block 702, an IVS receives a trigger for establishing an emergency call at a first vehicle. At block 704, the IVS determines, in response to the trigger, whether a communication system associated with the first vehicle currently has access to a first wireless communications network. For example, the IVS may determine if the connection is established with the first wireless communications network.

At block 706, the IVS searches for a second wireless communications network when the communication system currently does not have access. At block 708, the IVS searching for a second vehicle with peer-to-peer wireless access capability when the second wireless communications network is not found. The peer-to-peer wireless access may be a V2V network, a V2X network, or another type of network. At block 710, the IVS transmits vehicle related data to the second vehicle via the peer-to-peer wireless access capability when the second vehicle is found. In one configuration, the second vehicle forwards the vehicle related data to a PSAP.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communications media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for wireless communication, the method comprising:
   receiving a trigger for establishing an emergency call at a first vehicle, the emergency call trigger comprising an indication of a manual eCall or an indication of an automatic eCall triggered by an in-vehicle system (IVS);
   determining, in response to the trigger, whether a communication system associated with the first vehicle successfully established a connection with a first cellular communication network supporting out-of-band cellular transmissions to a public safety access point (PSAP);
   determining the communication system failed to establish the connection with the first cellular communication network;
   searching for a second cellular communication network supporting in-band cellular transmissions to the PSAP in response to the communication system failing to establish the connection with the first cellular communication network;
   searching for a second vehicle with peer-to-peer wireless access capability when the second cellular communication network is not found; and
   transmitting vehicle related data to the second vehicle via the peer-to-peer wireless access capability when the second vehicle is found.

2. The method of claim 1, further comprising establishing the emergency call when the communication system currently has access to the first cellular communication network.

3. The method of claim 1, further comprising:
   connecting to the second cellular communication network when the second cellular communication network is found; and
   establishing the emergency call when the communication system is connected to the second cellular communication network.

4. The method of claim 1, wherein the second vehicle transmits the vehicle related data to the PSAP via a third cellular communication network.

5. The method of claim 4, wherein the second vehicle searches for the third cellular communication network when a communication system associated with the second vehicle currently does not have access to the third cellular communication network.

6. The method of claim 5, wherein the second vehicle discards the vehicle related data after failing to find the third cellular communication network during a threshold period of time or after successfully transmitting the vehicle related data to the PSAP.

7. The method of claim 1, wherein the vehicle related data comprises at least one of a unique identifier associated with the first vehicle, a location of the first vehicle, a time at which the first vehicle received the trigger for establishing the emergency call, an indication of the emergency call trigger, or a combination thereof.

8. The method of claim 1, wherein the first cellular communication network and the second cellular communication network support access via long term evolution (LTE) or new radio (NR).

9. An apparatus for wireless communication, comprising:
   a memory; and
   at least one processor coupled to the memory, the at least one processor configured:
   to receive a trigger for establishing an emergency call at a first vehicle, the emergency call trigger comprising an indication of a manual eCall or an indication of an automatic eCall triggered by an in-vehicle system (IVS);
   to determine, in response to the trigger, whether a communication system associated with the first vehicle successfully established a connection with a first cellular communication network supporting out-of-band cellular transmissions to a public safety access point (PSAP);
   to determine the communication system failed to establish the connection with the first cellular communication network;
   to search for a second cellular communication network supporting in-band cellular transmissions to the PSAP in response to the communication system failing to establish the connection with the first cellular communication network;
   to search for a second vehicle with peer-to-peer wireless access capability when the second cellular communication network is not found; and
   to transmit vehicle related data to the second vehicle via the peer-to-peer wireless access capability when the second vehicle is found.

10. The apparatus of claim 9, wherein the at least one processor is further configured to establish the emergency call when the communication system currently has access to the first cellular communication network.

11. The apparatus of claim 9, wherein the at least one processor is further configured:
    to connect to the second cellular communication network when the second cellular communication network is found; and
    to establish the emergency call when the communication system is connected to the second cellular communication network.

12. The apparatus of claim 9, wherein the second vehicle transmits the vehicle related data to the PSAP via a third cellular communication network.

13. The apparatus of claim 12, wherein the second vehicle searches for the third cellular communication network when a communication system associated with the second vehicle currently does not have access to the third cellular communication network.

14. The apparatus of claim 13, wherein the second vehicle discards the vehicle related data after failing to find the third cellular communication network during a threshold period of time or after successfully transmitting the vehicle related data to the PSAP.

15. The apparatus of claim 9, wherein the vehicle related data comprises at least one of a unique identifier associated with the first vehicle, a location of the first vehicle, a time at which the first vehicle received the trigger for establishing the emergency call, an indication of the emergency call trigger, or a combination thereof.

16. The apparatus of claim 9, wherein the first cellular communication network and the second cellular communication network support access via long term evolution (LTE) or new radio (NR).

17. A non-transitory computer-readable medium having program code recorded thereon, the program code executed by a processor and comprising:
 program code to receive a trigger for establishing an emergency call at a first vehicle, the emergency call trigger comprising an indication of a manual eCall or an indication of an automatic eCall triggered by an in-vehicle system (IVS);
 program code to determine, in response to the trigger, whether a communication system associated with the first vehicle successfully established a connection with a first cellular communication network supporting out-of-band cellular transmissions to a public safety access point (PSAP);
 program code to determine the communication system failed to establish the connection with the first cellular communication network;
 program code to search for a second cellular communication network supporting in-band cellular transmissions to the PSAP in response to the communication system failing to establish the connection with the first cellular communication network;
 program code to search for a second vehicle with peer-to-peer wireless access capability when the second cellular communication network is not found; and
 program code to transmit vehicle related data to the second vehicle via the peer-to-peer wireless access capability when the second vehicle is found.

18. The non-transitory computer-readable medium of claim 17, wherein the program code further comprises program code to establish the emergency call when the communication system currently has access to the first cellular communication network.

19. The non-transitory computer-readable medium of claim 17, wherein the program code further comprises:
 program code to connect to the second cellular communication network when the second cellular communication network is found; and
 program code to establish the emergency call when the communication system is connected to the second cellular communication network.

20. The non-transitory computer-readable medium of claim 17, wherein the second vehicle transmits the vehicle related data to the PSAP via a third cellular communication network.

21. The non-transitory computer-readable medium of claim 20, wherein the second vehicle searches for the third cellular communication network when a communication system associated with the second vehicle currently does not have access to the third cellular communication network.

22. The non-transitory computer-readable medium of claim 21, wherein the second vehicle discards the vehicle related data after failing to find the third cellular communication network during a threshold period of time or after successfully transmitting the vehicle related data to the PSAP.

23. The non-transitory computer-readable medium of claim 17, wherein the vehicle related data comprises at least one of a unique identifier associated with the first vehicle, a location of the first vehicle, a time at which the first vehicle received the trigger for establishing the emergency call, an indication of the emergency call trigger, or a combination thereof.

24. The non-transitory computer-readable medium of claim 17, wherein the first cellular communication network and the second cellular communication network support access via long term evolution (LTE) or new radio (NR).

\* \* \* \* \*